United States Patent
Ramirez Pavon et al.

(10) Patent No.: US 10,076,187 B2
(45) Date of Patent: Sep. 18, 2018

(54) DRAWER ASSEMBLY WITH BEZEL INCLUDING AN INTEGRAL DRAWER CENTERING DEVICE

(71) Applicant: FORD GLOBAL TECHNOLOGIES, LLC, Dearborn, MI (US)

(72) Inventors: Omar Antonio Ramirez Pavon, Mexico City (MX); Francisco Ronquillo Melendez, Puebla (MX); Jose Alfredo Peregrina Loera, México City (MX); David Castro Duran, Nezahualcoyotl (MX)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 14/922,446

(22) Filed: Oct. 26, 2015

(65) Prior Publication Data
US 2017/0112279 A1   Apr. 27, 2017

(51) Int. Cl.
| | | |
|---|---|---|
| *A47B 88/40* | (2017.01) | |
| *A47B 88/04* | (2006.01) | |
| *A47B 88/00* | (2017.01) | |
| *A47B 88/12* | (2006.01) | |

(52) U.S. Cl.
CPC ...... *A47B 88/0455* (2013.01); *A47B 88/0085* (2013.01); *A47B 88/12* (2013.01); *A47B 2210/0054* (2013.01); *A47B 2210/0059* (2013.01)

(58) Field of Classification Search
CPC .. A47B 88/12; A47B 88/0455; A47B 88/0085
USPC .... 312/330.1, 331, 334.1, 334.7, 319.1, 246
See application file for complete search history.

(56) References Cited

U.S. PATENT DOCUMENTS

| | | | | |
|---|---|---|---|---|
| 2,606,091 | A | * 8/1952 | Marion | A47B 88/12 312/334.16 |
| 2,944,865 | A | * 7/1960 | Hammesfahr | B60N 3/083 188/77 R |
| 3,460,876 | A | * 8/1969 | De Boer | B60N 3/083 224/280 |
| 3,574,437 | A | 4/1971 | Stein et al. | |
| 3,586,394 | A | * 6/1971 | Hecksel | A47B 88/12 312/246 |
| 3,600,051 | A | * 8/1971 | De Boer | A47B 88/0407 224/280 |
| 3,738,725 | A | * 6/1973 | Visser | F16C 29/02 206/587 |
| 4,119,377 | A | 10/1978 | Barber et al. | |
| 4,440,462 | A | 4/1984 | Manson | |

(Continued)

FOREIGN PATENT DOCUMENTS

| | | |
|---|---|---|
| CN | 203739768 U | 7/2014 |
| WO | 2009027127 A1 | 3/2009 |

OTHER PUBLICATIONS

English machine translation of CN203739768U.
English machine translation of WO2009027127A1.

*Primary Examiner* — James Orville Hansen
(74) *Attorney, Agent, or Firm* — Vichit Chea; King & Schickli, PLLC

(57) ABSTRACT

A drawer assembly is provided. That drawer assembly includes a drawer and a bezel. The bezel includes an integral drawer centering device whereby smooth sliding action of the drawer in the bezel is provided. The bezel and the integral drawer centering device are molded as a unitary component.

13 Claims, 5 Drawing Sheets

(56) References Cited

U.S. PATENT DOCUMENTS

| | | | |
|---|---|---|---|
| 5,018,800 A | | 5/1991 | Cziptschirsch et al. |
| 5,123,721 A | * | 6/1992 | Seo .................. G06F 1/184 |
| | | | 312/333 |
| 5,645,340 A | * | 7/1997 | Colton ............... B60Q 3/007 |
| | | | 296/37.9 |
| 5,992,957 A | * | 11/1999 | Ecker ............... H05K 7/1411 |
| | | | 312/334.16 |
| 6,209,842 B1 | | 4/2001 | Anderson et al. |
| 2002/0101143 A1 | | 8/2002 | Crooks et al. |
| 2010/0301721 A1 | | 12/2010 | Nebel |
| 2012/0224796 A1 | | 9/2012 | Carey, Jr. et al. |

\* cited by examiner

DRAWER ASSEMBLY WITH BEZEL INCLUDING AN INTEGRAL DRAWER CENTERING DEVICE

TECHNICAL FIELD

This document relates generally to the field of drawer assemblies and, more particularly, to a drawer assembly incorporating a drawer and a bezel including an integral drawer centering device whereby a smooth sliding action of the drawer in the bezel is provided.

BACKGROUND

Drawer assemblies incorporating a drawer received for sliding movement in a supporting bezel are well known in the art. Such drawer assemblies are commonly employed in motor vehicles as a convenient and effective way to store small items at convenient locations within the interior of the motor vehicle.

A typical drawer assembly comprises a drawer including opposed rails or runners that are received for sliding movement within cooperating opposed guide tracks or channels provided in the bezel. Drawer assemblies made from plastic are relatively inexpensive to produce. However, molded plastic drawer assemblies are typically subject to manufacturing tolerances that adversely affects the sliding action of the drawer with respect to the bezel and too much clearance allowing for vibration and rattling of the drawer in the bezel.

In order to address these concerns, metal parts with closer manufacturing tolerances have been used on drawer assemblies. While drawer assemblies incorporating metal parts do provide a high quality sliding action and do restrict or eliminate vibration and rattling, such parts complicate manufacture and assembly and increase costs.

This document relates to a new and improved drawer assembly made from plastic materials wherein the bezel incorporates an integral drawer centering device to (1) properly align the drawer in the bezel for smooth sliding action as well as (2) reduce or eliminate vibration and rattling. Advantageously, the reduction in the overall number of parts for the drawer assembly and the elimination of the need to utilize metal parts to achieve the desired results substantially reduces the manufacturing costs while meeting customer expectations. As such, the drawer assembly described herein represents a significant advance in the art.

SUMMARY

In accordance with the purposes and benefits described herein, a drawer assembly is provided. That drawer assembly comprises a drawer and a bezel. The bezel includes an integral drawer centering device whereby smooth sliding action of the drawer in the bezel is provided. Advantageously, the bezel and the integral drawer centering device are molded as a unitary component.

In one possible embodiment, the integral drawer centering device comprises a plurality of resilient cams projecting from the bezel and engaging the drawer. In one particularly useful embodiment the integral drawer centering device comprises a first resilient cam and a second resilient cam both projecting from the bezel and engaging the drawer. Further, the first resilient cam is opposed to the second resilient cam.

The first resilient cam is carried on a first cantilevered support lug. Similarly, the second resilient cam is carried on a second cantilevered support lug. The first cam includes a first drawer engaging surface and the second cam includes a second drawer engaging surface. The first drawer engaging surface extends parallel to the second drawer engaging surface and the first drawer engaging surface is spaced a distance D from the second drawer engaging surface when the first cam and the second cam are in home positions.

In contrast, the drawer has a width W at a line of engagement with the first cam and the second cam. The drawer width W is greater than the distance D between the cams so that an interference fit is provided between the drawer and the first and second cams. As a result, the first and second cams are biased toward each other by the first and second cantilevered support lugs. This results in the centering of the drawer in the bezel in a manner that provides proper alignment and smooth sliding action of the drawer within the bezel.

In accordance with an additional aspect, the drawer includes opposed rails and the bezel includes opposed guide channels for receiving the opposed rails. Further, the first drawer engaging surface and the second drawer engaging surface engage the drawer adjacent the opposed rails.

In accordance with another embodiment, the integral drawer centering device further comprises a third resilient cam and a fourth resilient cam projecting from the bezel and engaging the drawer. The third and fourth resilient cams are also opposed. More specifically, the third resilient cam is carried on a third cantilevered support lug and the fourth resilient cam is carried on a fourth cantilevered support lug. The third cam and the fourth cam project from the bezel and provide an interference fit with the drawer in a manner similar to the first and second cams.

In accordance with still another aspect, the first and the second cam include a beveled edge at opposed ends of the first drawer engaging surface and the second drawer engaging surface. The leading beveled edges of the cams help to align and locate the drawer between the opposed cams when the drawer is inserted in the bezel.

In accordance with yet another aspect, a method is provided of self-centering a drawer in a bezel so as to provide for smooth sliding operation of the drawer in the bezel. That method may be broadly described as comprising the steps of integrally forming opposed, resilient cams on the bezel and providing an interference fit between the opposed resilient cams of the bezel and the side walls of the drawer received in the bezel.

The method may also include the step of providing the opposed resilient cams on cantilevered support lugs. Still further the method may also include a second set of opposed resilient cams on the bezel and providing an interference fit between the second set of opposed resilient cams on the bezel and the drawer received in the bezel.

In the following description, there are shown and described several preferred embodiments of the drawer assembly. As it should be realized, the drawer assembly is capable of other, different embodiments and its several details are capable of modification in various, obvious aspects all without departing from the drawer assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the drawer assembly and together with the description serve to explain certain principles thereof. In the drawing figures.

Reference will now be made in detail to the present preferred embodiments of the drawer assembly, examples of which are illustrated in the accompanying drawing figures.

DETAILED DESCRIPTION

Figure 1:
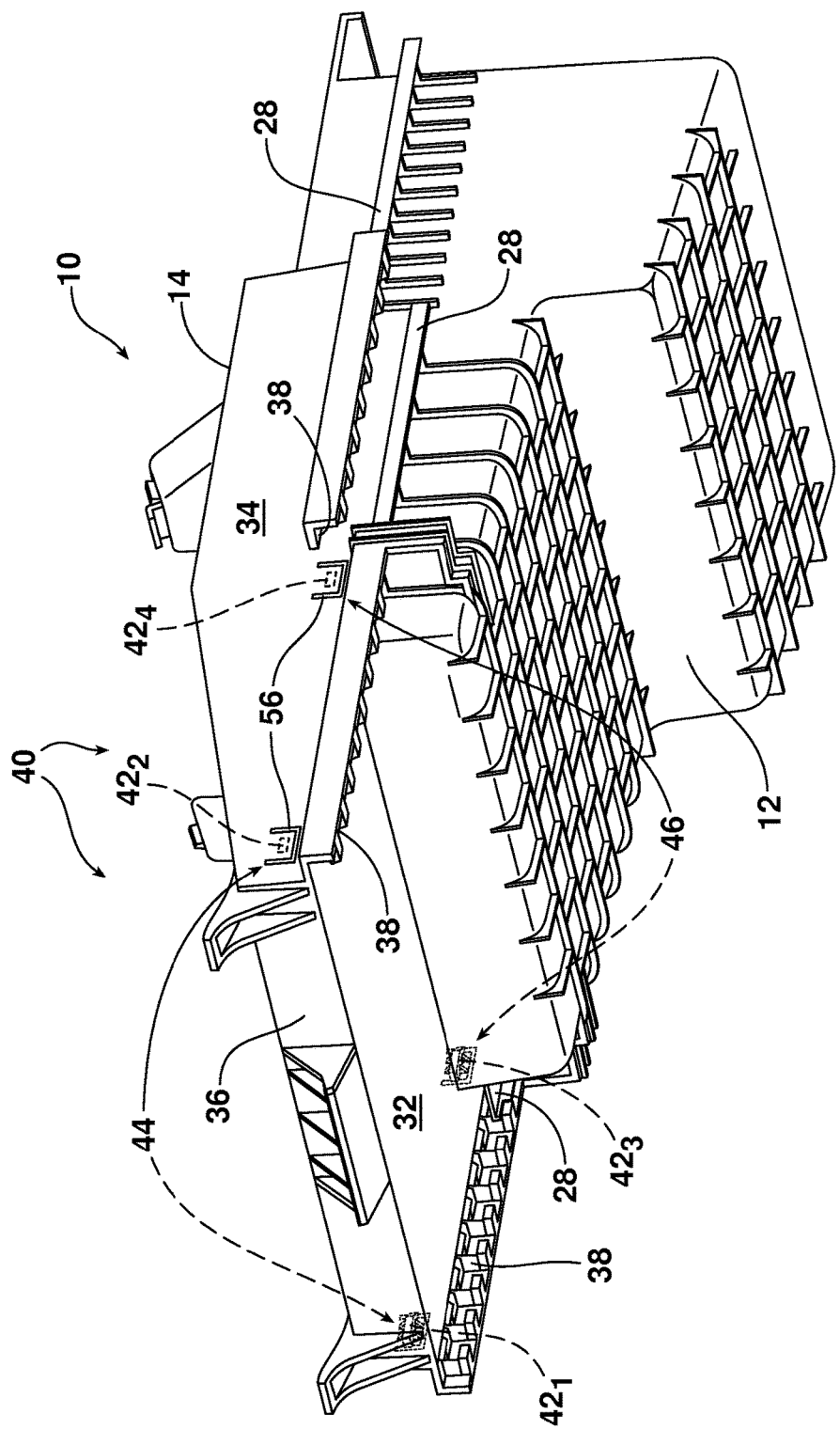
FIG. 1 is a rear perspective view of the drawer assembly with the drawer received for sliding movement within the bezel.
Figure 2:
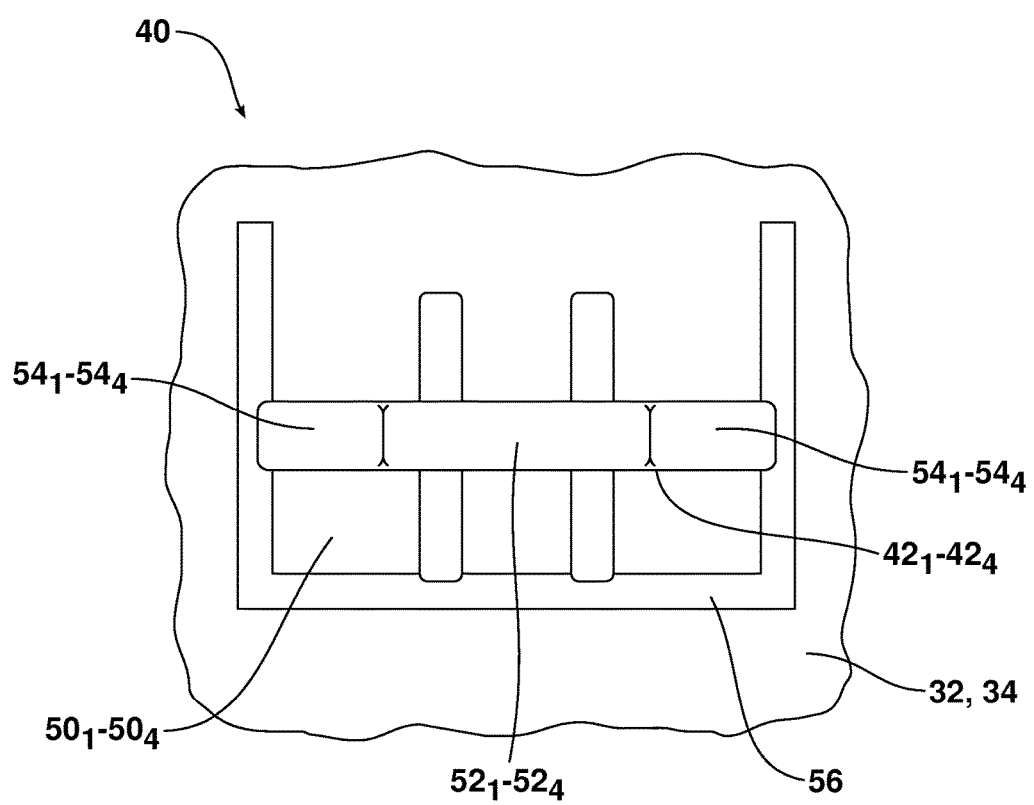
FIG. 2 is a detailed front elevational view of a single resilient cam of the integral drawer centering device that is formed as a part of the bezel.
Figure 3:
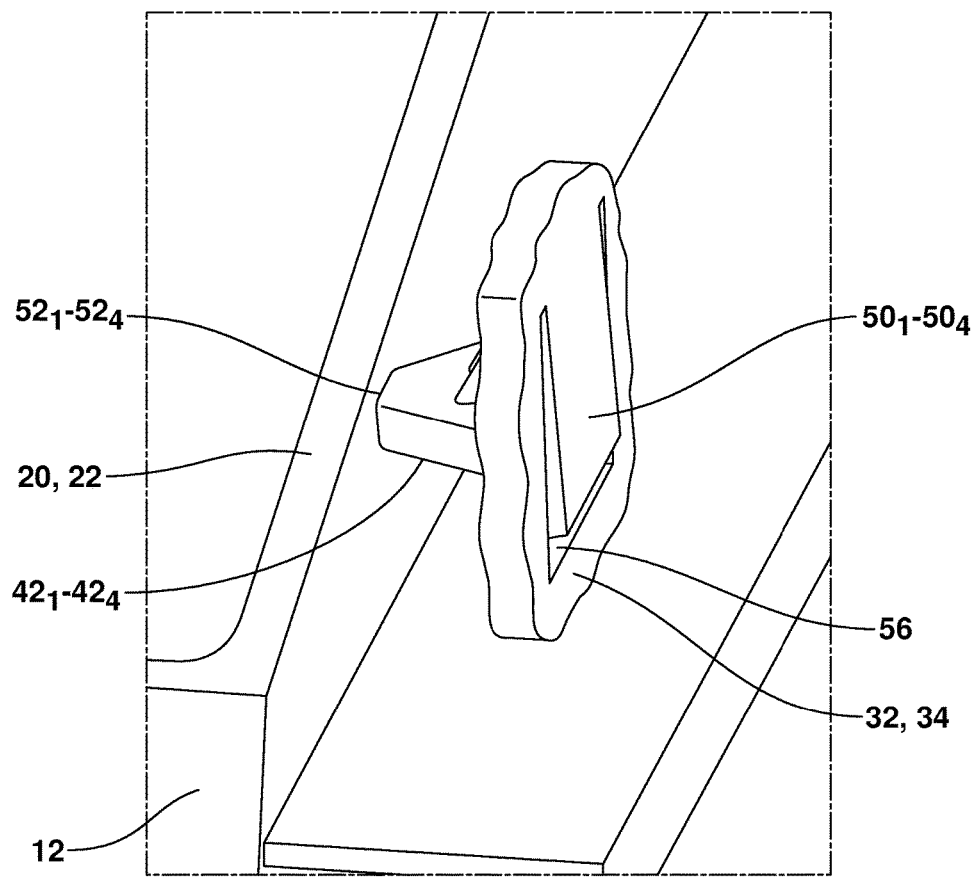
FIG. 3 is a detailed perspective view illustrating engagement of the resilient cam illustrated in FIG. 2 with a side wall of the drawer.

Reference is now made to FIGS. 1-3 illustrating a first embodiment of the drawer assembly 10. The drawer assembly 10 includes a drawer 12 and a bezel 14. The drawer 12 includes a front wall 16 and a rear wall 18, two opposed side walls 20, 22 and a bottom wall 24 forming a storage compartment 26. Two opposed rails or runners 28 project outwardly from the side walls.

The bezel 14 includes a top wall 30, two opposed side walls 32, 34 and a rear wall 36. The side walls 32, 34 each include a guide track or channel 38. The opposed guide channels 38 on the side walls 14 open inwardly to receive the opposed rails or runners 28 on the drawer 12 so that the drawer 12 is supported for free sliding engagement in the bezel 14 and, therefore, may be displaced between an open position and a closed position.

As illustrated in FIGS. 1-3, the bezel 14 includes an integral drawer centering device generally designated by reference numeral 40. In the illustrated embodiment the integral drawer centering device 40 comprises a plurality of resilient cams $42_1$-$42_4$ that project from the bezel 14 and engage and center the drawer 12 so as to provide for smooth sliding action of the drawer with respect to the bezel.

More specifically, in the illustrated embodiment, the integral drawer centering device 40 includes a first cam set 44 comprising cams $42_1$, $42_2$ and a second cam set 46 comprising cams $42_3$, $42_4$. One cam $42_1$, $42_3$ of each cam set 44, 46 is integrally formed with the side wall 32 of the bezel 14. Similarly, one cam $42_2$, $42_4$ of each cam set 44, 46 is integrally formed with the side wall 34 of the bezel 14.

As best illustrated with reference to FIG. 2, each resilient cam $42_1$-$42_4$ is carried on a cantilevered support leg. Thus, the first cam $42_1$ is carried on a first cantilevered support leg $50_1$ while the second cam $42_2$ is carried on a second cantilevered support leg $50_2$, the third cam $42_3$ is carried on a third cantilevered support leg $50_3$ and the fourth cam $42_4$ is carried on a fourth cantilevered support leg $50_4$. Further each cam $42_1$-$42_4$ includes a first drawer engaging surface $52_1$-$52_4$ and beveled edges or ramps $54_1$-$54_4$ at opposed ends of the drawer engaging surface. These beveled edges or ramps $54_1$-$54_4$ help locate and center the drawer 12 in the bezel 14.

In the embodiment illustrated in FIGS. 1-3, the resilient cams $42_1$-$42_4$ are each formed within a U-shaped slot 56 and have a cantilevered connection to the side walls 32, 34 at the top. In contrast, in the embodiment illustrated in FIGS. 4 and 5, the U-shaped slot 56 is reoriented through 90° and the cantilevered connection to the side walls 32, 34 is at one side of the resilient cams $42_1$-$42_4$.

Figure 4:
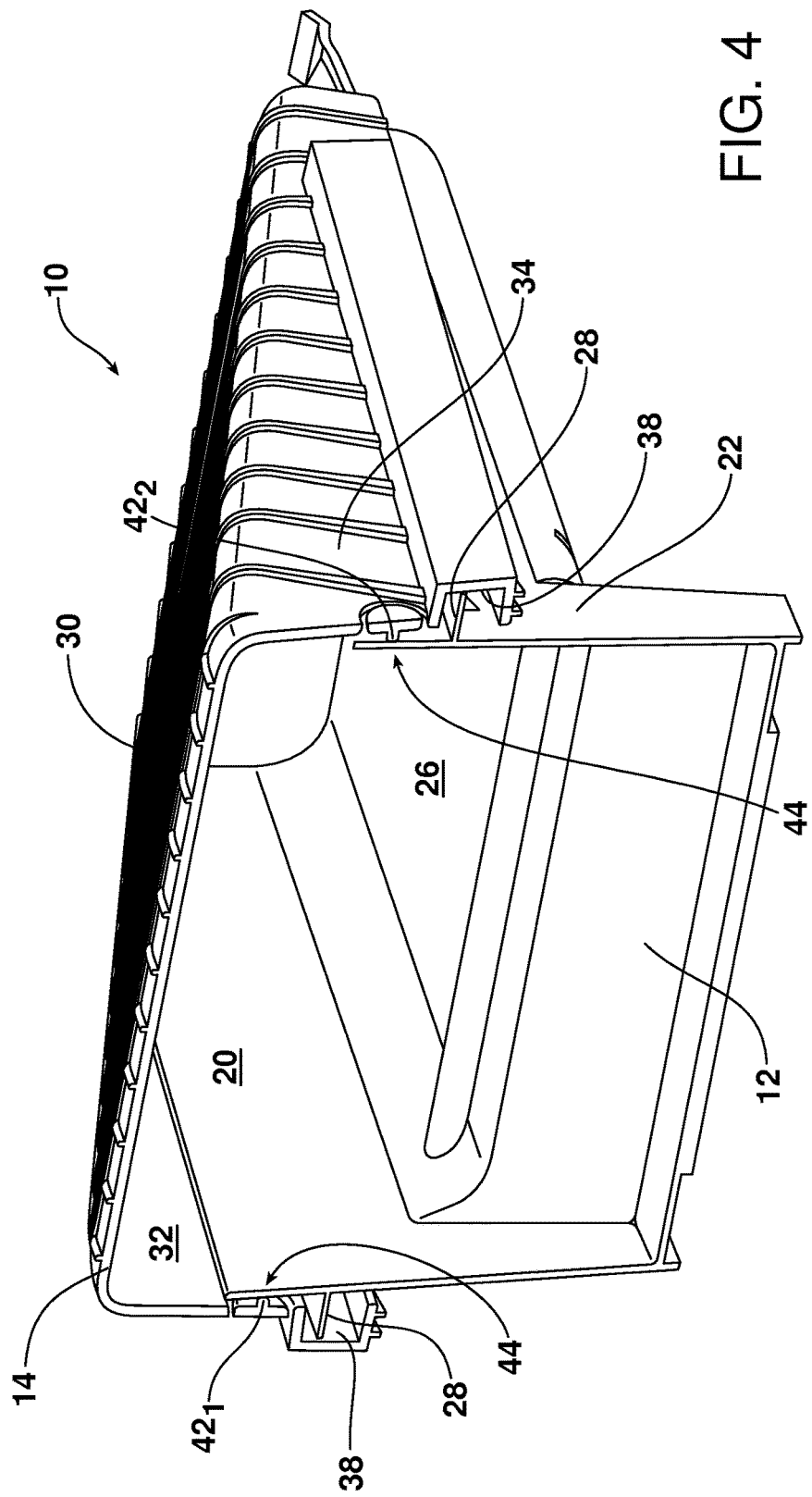
FIG. 4 is a cross-sectional view of an alternative embodiment in a transverse direction through the bezel and drawer illustrating how the opposed resilient cams of the integral drawer centering device self-center and align the drawer in the bezel to allow for smooth sliding operation as well as to prevent vibration and rattling between the drawer and the bezel.
Figure 5:
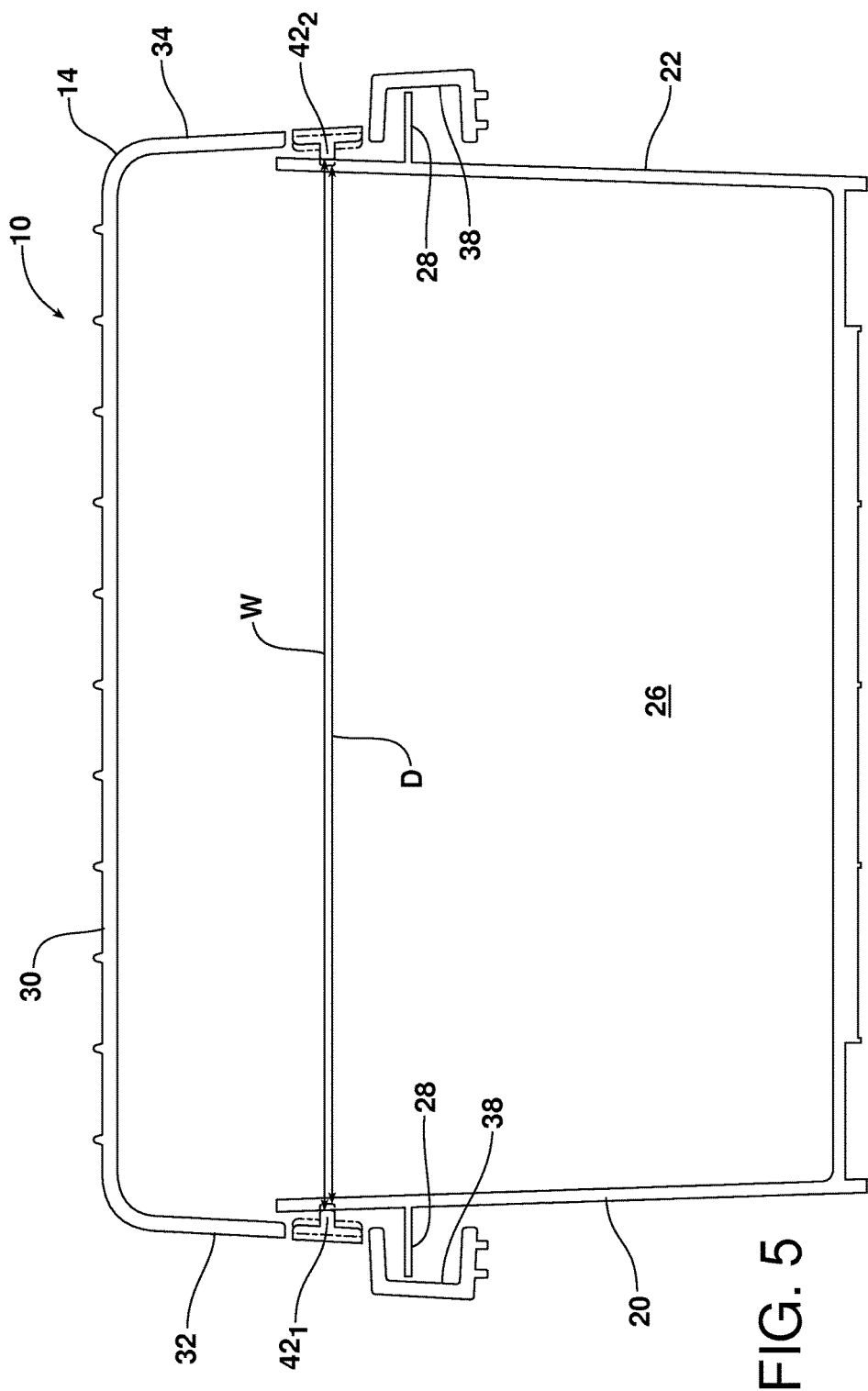
FIG. 5 is a detailed cross-sectional view of one cam of the FIG. 4 embodiment showing engagement of that cam with the drawer.

Reference is now made to FIGS. 4 and 5 illustrating the first set 44 of opposed resilient cams $42_1$, $42_2$. As illustrated, the first cam $42_1$ has a first drawer engaging surface $52_1$ that extends parallel to the second drawer engaging surface $52_2$ of the second cam $42_2$. The first drawer engaging surface $52_1$ is spaced a distance D from the second drawer engaging surface $52_2$ when the first and second cams $48_1$, $48_2$ are in their home positions (see phantom line position shown in FIG. 5), that is, when the cantilevered support legs $50_1$ and $50_2$ upon which the cams are carried depend directly downwardly in line with the side walls 32, 34 of the bezel 14.

In contrast, the drawer 12 has a width W defined by the side walls 20, 22 at a line of engagement with the first and second cams $42_1$, $42_2$ where W is greater than D. Thus, it should be appreciated that the distance between the drawer engaging surfaces $52_1$ and $52_2$ of the cams $42_1$ and $42_2$ and the width of the drawer side walls 20, 22 provide for interference fit of the drawer between the first and second cams. Thus, it should be appreciated that the cams $42_1$ and $42_2$ of the first cam set 44 are pretensioned and thereby biased toward each other by the first and second cantilevered support lugs $50_1$, $50_2$. As a result, the cams $42_1$, $42_2$ provide a biasing force to align and center the drawer 12 in the bezel 14 so as to provide smooth sliding action. While not illustrated, it should be appreciated that the cams $42_3$ and $42_4$ of the second set 46 of resilient cams 42 are configured to provide a similar interference fit with the side walls 20, 22 of the drawer to thereby provide the same centering action.

As should be appreciated from above, the integral drawer centering device 40 described herein functions in accordance with a method of self-centering a drawer 12 in a bezel 14 so as to provide smooth sliding operation of the drawer in the bezel. That method may be described as comprising the steps of integrally forming opposed, resilient cams $42_1$-$42_4$ on the bezel 14 and providing an interference fit between the opposed resilient cams on the bezel and side walls 20, 22 of the drawer 12 received in the bezel. This method may further include providing the opposed resilient cams $42_1$-$42_4$ on cantilevered support lugs $50_1$-$50_4$. Further the method may include a second set of opposed resilient cams 46 on the bezel 14 as well as providing an interference fit between that second set of opposed resilient cams on the bezel and the drawer 12 received in the bezel.

In summary, numerous benefits are provided by the drawer assembly 10. As should be appreciated, the bezel 14 and the integral drawer centering device 40 are molded as a unitary component in a cost effective molding operation using inexpensive plastic or composite materials. No extra parts or assemblies are needed so production and assembly costs remain low. Advantageously, the opposed resilient cams $42_1$-$42_4$ function as plastic springs to self-center the drawer 12 and the bezel 14 so as to provide a smooth sliding action with improved fit and feel during operation to thereby enhance customer satisfaction. Further the beveled edges or ramps $54_1$-$54_4$ at the ends of the drawer engaging surfaces $52_1$-$52_4$ allow for easy location of the drawer 12 in the bezel 14 while sliding a drawer in or out. Further, the drawer assembly 10 including the bezel 14 with the integrated drawer centering device 40, is simple in structure, may be packaged in a limited space and is very easy to manufacture. While the illustrated embodiment includes two sets 44, 46 of opposed resilient cams $42_1$-$42_4$ it should be appreciated that as many sets as are necessary to support the drawer 12 in a centered position in the bezel 14 may be provided.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A drawer assembly, comprising:
    a drawer; and
    a bezel including two opposed side walls and an integral drawer centering device whereby smooth sliding action of said drawer in said bezel is provided, wherein said integral drawer centering device includes a plurality of resilient cams projecting from said bezel and engaging said drawer, wherein each of the plurality of cams are formed within a U-shaped slot and have a cantilevered connection to the side walls, and wherein each of the plurality of resilient cams includes a drawer engaging surface and beveled edges at opposed ends of the drawer engaging surface.

2. The drawer assembly of claim 1, wherein said bezel and said integral drawer centering device are molded as a unitary component.

3. The drawer assembly of claim 1, wherein a first resilient cam is opposed to a second resilient cam.

4. The drawer assembly of claim 3, wherein said first resilient cam is carried on a first cantilevered support lug and said second resilient cam is carried on a second cantilevered support lug.

5. The drawer assembly of claim 4, wherein said first cam includes a first drawer engaging surface and said second cam includes a second drawer engaging surface.

6. The drawer assembly of claim 5, wherein said first drawer engaging surface extends parallel to said second drawer engaging surface and said first drawer engaging surface is spaced a distance D from said second drawer engaging surface when said first cam and said second cam are in home positions.

7. The drawer assembly of claim 6, wherein said drawer has a width W at a line of engagement with said first cam and said second cam and W>D so as to provide an interference fit of said drawer between said first cam and said second cam so that said first cam and said second cam are biased toward each other by said first cantilevered support lug and said second cantilevered support lug and said drawer is centered on said bezel.

8. The drawer assembly of claim 7, wherein said drawer includes opposed rails and said bezel includes opposed guide channels for receiving said opposed rails.

9. The drawer assembly of claim 8, wherein said first drawer engaging surface and said second drawer engaging surface engage said drawer adjacent said opposed rails.

10. The drawer assembly of claim 9, wherein said integral drawer centering device comprises a third resilient cam and a fourth resilient cam projecting from said bezel and engaging said drawer.

11. The drawer assembly of claim 10, wherein said third resilient cam is opposed to said fourth resilient cam.

12. The drawer assembly of claim 11, wherein said third resilient cam is carried on a third cantilevered support lug and said fourth resilient cam is carried on a fourth cantilevered support lug.

13. The drawer assembly of claim 12, wherein said third resilient cam and said fourth resilient cam project from said bezel and provide an interference fit with said drawer.

\* \* \* \* \*